(12) United States Patent
Kim et al.

(10) Patent No.: US 8,594,752 B2
(45) Date of Patent: Nov. 26, 2013

(54) SLIDING/SWING MODULE AND MOBILE TERMINAL HAVING SAME

(75) Inventors: Jin-Soo Kim, Suwon-si (KR); Jae-Chul Jin, Suwon-si (KR); Young-Ki Kim, Yongin-si (KR)

(73) Assignee: Samsung Electronics Co., Ltd (KR)

( * ) Notice: Subject to any disclaimer, the term of this patent is extended or adjusted under 35 U.S.C. 154(b) by 1395 days.

(21) Appl. No.: 11/944,255

(22) Filed: Nov. 21, 2007

(65) Prior Publication Data

US 2008/0125201 A1 May 29, 2008

(30) Foreign Application Priority Data

Nov. 24, 2006 (KR) .................. 10-2006-0116895

(51) Int. Cl.
*H04W 88/02* (2009.01)
(52) U.S. Cl.
USPC ....................................... 455/575.3
(58) Field of Classification Search
USPC ......... 455/575.4, 575.3, 575.1; 370/310, 343; 361/679.01; 345/173; 3/575.4, 575.3
See application file for complete search history.

(56) References Cited

U.S. PATENT DOCUMENTS

| | | | | |
|---|---|---|---|---|
| 7,287,302 B2 * | 10/2007 | Park et al. | .................. | 16/330 |
| 7,336,979 B2 * | 2/2008 | Soejima | .................. | 455/575.1 |
| 7,443,979 B2 * | 10/2008 | Kim | .................. | 379/433.12 |
| 7,478,972 B2 * | 1/2009 | Takamori et al. | .................. | 403/409.1 |
| 2005/0288075 A1 * | 12/2005 | Geernaert | .................. | 455/575.4 |
| 2006/0046797 A1 | 3/2006 | Chen | | |
| 2006/0073858 A1 * | 4/2006 | Nagashima | .................. | 455/575.4 |
| 2008/0070649 A1 * | 3/2008 | Uchida | .................. | 455/575.4 |
| 2008/0242380 A1 * | 10/2008 | Kajihara et al. | .................. | 455/575.4 |
| 2009/0070711 A1 * | 3/2009 | Kwak et al. | .................. | 715/829 |
| 2010/0197372 A1 * | 8/2010 | Takagi et al. | .................. | 455/575.4 |

FOREIGN PATENT DOCUMENTS

| | | |
|---|---|---|
| CN | 1750547 | 3/2006 |
| KR | 20-0371528 | 12/2004 |
| KR | 1020050061272 | 6/2005 |
| KR | 1020050094208 | 9/2005 |
| KR | 1020060049528 | 5/2006 |
| KR | 1020060101737 | 9/2006 |
| KR | 1020070043287 | 4/2007 |
| KR | 1020070050128 | 5/2007 |
| WO | WO 2006/098590 | 9/2006 |

* cited by examiner

*Primary Examiner* — Diane Mizrahi
(74) *Attorney, Agent, or Firm* — The Farrell Law Firm, P.C.

(57) ABSTRACT

A sliding/swing module is provided for use in a mobile terminal having a first housing and a facing second housing coupled to the first housing, the sliding/swing module including a fixed member mounted on the first housing; and a movable member mounted on the second housing and coupled to the fixed member, the movable member being movable in a linear reciprocating manner or in a rotational manner while facing the fixed member. The sliding/swing module enables both a linear reciprocating movement and a rotational movement of a housing so that the user can open the mobile terminal in a sliding or swing manner suitable for multimedia services or communication services.

19 Claims, 10 Drawing Sheets

SLIDING/SWING MODULE AND MOBILE TERMINAL HAVING SAME

PRIORITY

This application claims priority under 35 U.S.C. §119(a) to an application entitled "Sliding/Swing Module and Mobile Terminal Having Same" filed in the Korean Industrial Property Office on Nov. 24, 2006 and assigned Serial No. 2006-116895, the contents of which are incorporated herein by reference.

BACKGROUND OF THE INVENTION

1. Field of the Invention

The present invention relates to a mobile terminal, and more particularly to a sliding/swing module for coupling a pair of facing housings, one of which can move on the other housing to open or close one side of the other housing, and a mobile terminal having the same.

2. Description of the Related Art

Generally, mobile terminals are classified into a bar type, a flip type and a folder type according to their shape.

A bar-type mobile terminal has a single housing provided with a data input/output means, a mouthpiece and an earpiece. Since a keypad that serves as a data input/output means is always exposed, it may be inadvertently pressed by a user to cause an error or an undesired function. Also, there is a limitation in reducing the size of bar-type mobile terminals because a sufficient distance is needed between the mouthpiece and the earpiece.

A flip-type mobile terminal has a main housing, a flip and a hinge module that connects the flip to the main housing. The main housing is also provided with a data input/output means, a mouthpiece and an earpiece. Since the flip covers the data input/output means, i.e., the keypad, it can prevent any inadvertent key-pressing. However, there is still a limitation in reducing the size of flip-type mobile terminals because of the need to secure a sufficient distance between the mouthpiece and the earpiece.

A folder-type mobile terminal has a main housing, a folder and a hinge module that connects the folder rotatably to the main housing. In a call waiting mode with the folder closed, the keypad of the main housing is covered to prevent inadvertent key-pressing. In a call mode with the folder opened and apart from the main housing, a sufficient distance is secured between the mouthpiece and the earpiece. Accordingly, it is relatively easy to reduce the size of folder-type mobile terminals. Due to this advantage, folder-type mobile terminals have gained popularity.

With the increasing penetration of mobile terminals in the market, a variety of designs have been suggested to meet the needs and tastes of users. Among such designs, a slide type with one housing slidable on the other housing to open or close the other housing is becoming increasingly popular, and now has a bigger market share than the folder-type. To meet this mobile market trend and enhance the user's convenience, various sliding modules, which enable one housing to semi-automatically slide up on the other housing, are used in slide-type terminals.

Recently, multifunctional mobile terminals have been launched to offer various multimedia services, such as Digital Multimedia Broadcast (DMB) services and music/moving picture file reproduction. Such mobile terminals generally have a housing which can swivel on the other housing in order to provide a wider display (i.e. a landscape display mode) suitable for multimedia services, such as DMB.

Conventional folder-type and slide-type mobile terminals are both convenient to use basic communication services, such as voice calls or Short Message Service (SMS). However, the two types of mobile terminals provide a display only in a fixed vertical direction, which is not suitable to use multimedia services (for example, DMB services). Swing-type mobile terminals can swivel a display screen in a direction providing a wider or horizontal display suitable to use multimedia services. However, swing-type terminals, which are focused on the multimedia services, are not convenient for users to make voice calls or use other communication services.

SUMMARY OF THE INVENTION

Accordingly, the present invention has been made to solve the above-mentioned problems occurring in conventional systems, and the present invention provides a sliding/swing module for improving convenience in using multimedia services, such as DMB services, as well as communication services, such as voice calls, and a mobile terminal having the same module.

Also, the present invention provides a sliding/swing module for use in a small-sized mobile terminal with improved portability.

In accordance with an aspect of the present invention, there is provided a sliding/swing module for use in a mobile terminal having a first housing and a facing second housing coupled to the first housing. The sliding/swing module for coupling the second housing to the first housing includes a fixed member mounted on the first housing; and a movable member mounted on the second housing and coupled to the fixed member, the movable member being movable in a linear reciprocating manner or in a rotational manner while facing the fixed member.

In accordance with another aspect of the present invention, there is provided a mobile terminal including a first housing; a second housing coupled to the first housing while facing one side of the second housing; and a sliding/swing module for coupling the second housing to the first housing to face each other, wherein the second housing is movable in a linear reciprocating manner in a longitudinal direction or in a rotational manner while facing the first housing.

BRIEF DESCRIPTION OF THE DRAWINGS

The above and other aspects, features and advantages of the present invention will be more apparent from the following detailed description taken in conjunction with the accompanying drawings, in which.

DETAILED DESCRIPTION OF THE PREFERRED EMBODIMENTS

Hereinafter, exemplary embodiments of the present invention will be described with reference to the accompanying drawings. In the following description of the present invention, a detailed description of known functions and configurations incorporated herein will be omitted when it may make the subject matter of the present invention rather unclear.

The present invention provides a sliding/swing module for use in a mobile terminal having a pair of facing housings. The module includes a fixed member mounted on a first housing and a movable member mounted on an other, second, housing and coupled to the fixed member. The movable member can move in a linear manner in a longitudinal direction or in a rotational manner while facing the fixed member.

Linear movement of the movable member opens one side of the first housing with the fixed member. Rotational movement of the movable member rotates the second housing and places the second housing in a direction perpendicular to the length of the first housing provided with the fixed member. Also, one side of the first housing is opened at this time.

Figure 1:
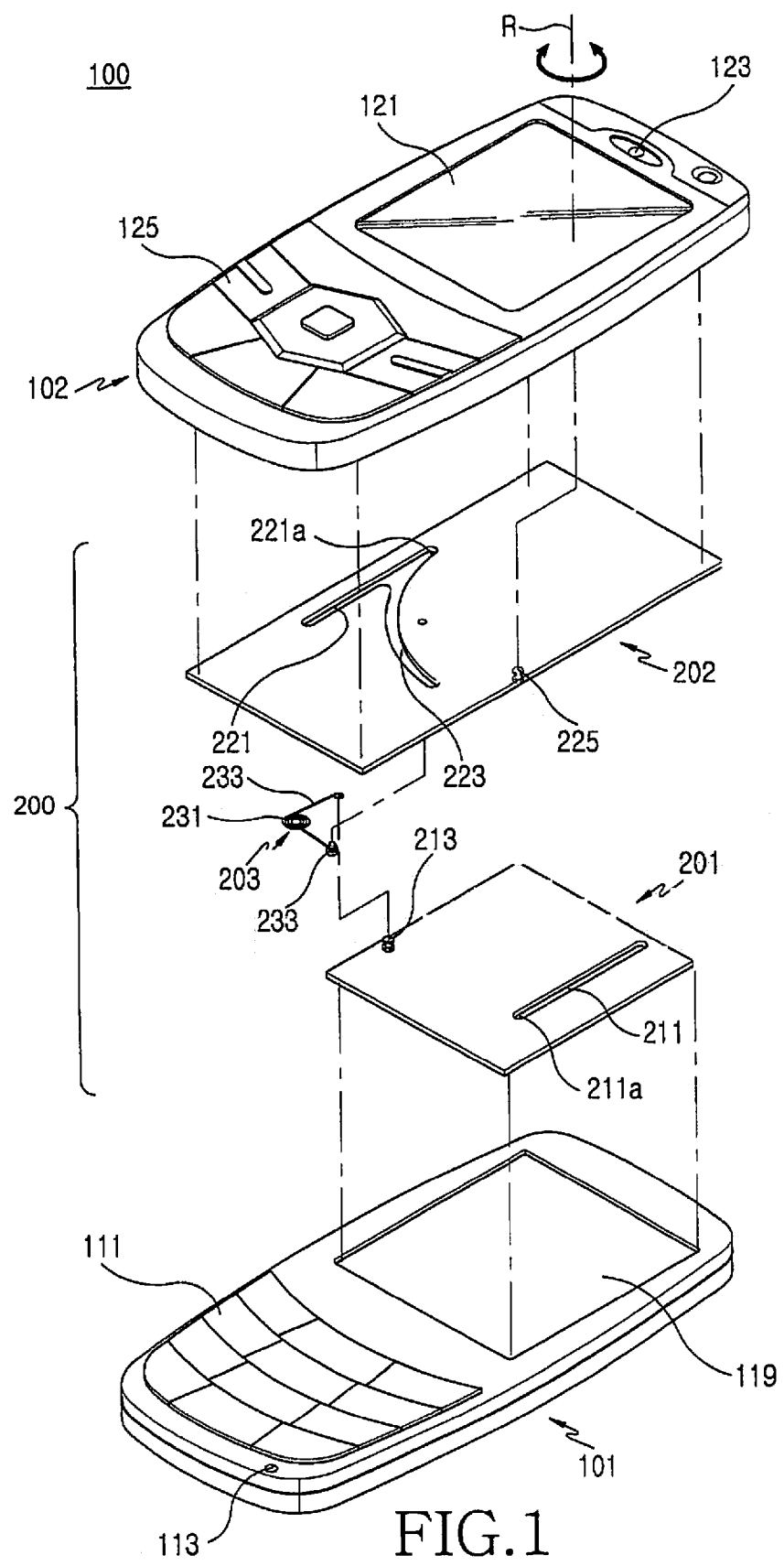
FIG. 1 is an exploded perspective view of a mobile terminal having a sliding/swing module according to a preferred embodiment of the present invention.

Referring to FIG. 1, a mobile terminal 100 having a sliding/swing module 200 includes a first housing 101 and a second housing 102, which are coupled by the sliding/swing module 200 to face each other.

Figure 7:
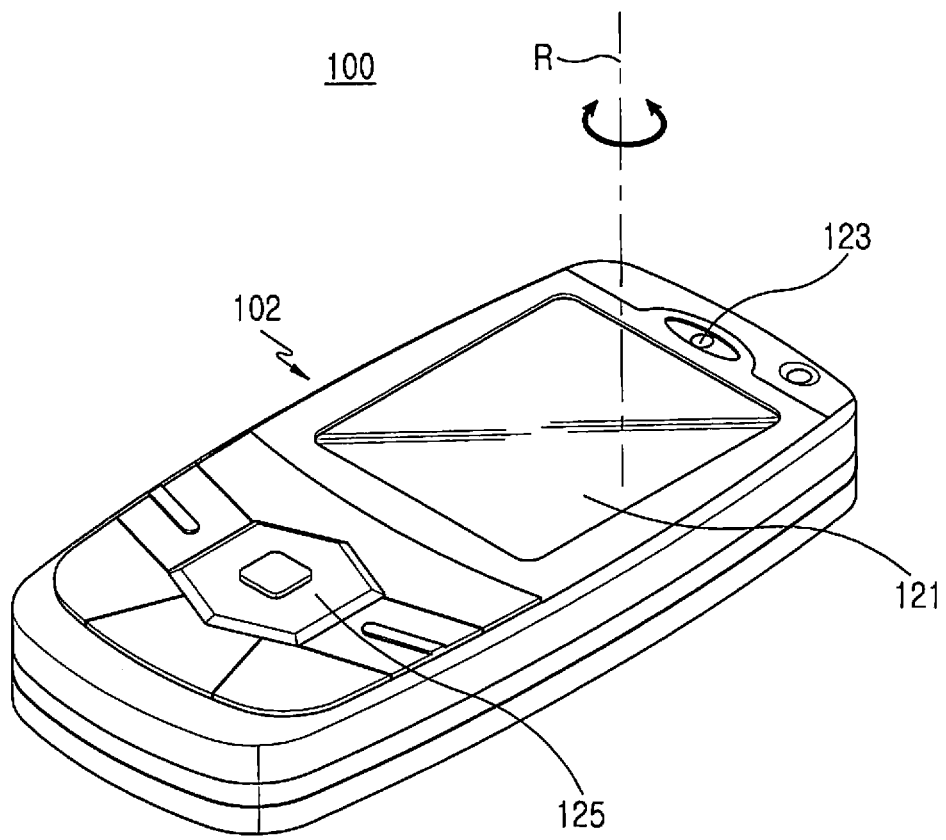
FIG. 7 is an assembled perspective view of the mobile terminal in FIG. 1.
Figure 8:
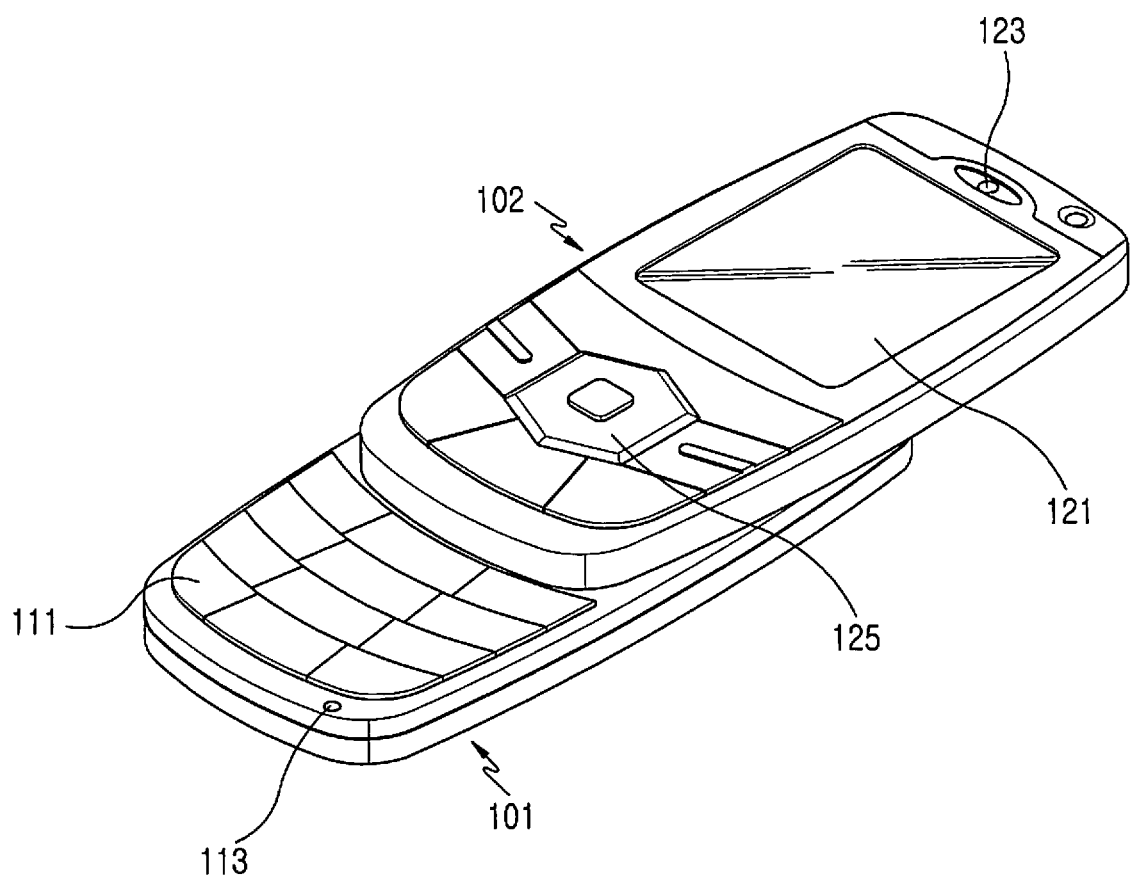
FIG. 8 is a perspective view of the mobile terminal in FIG. 1 with a second housing moved up linearly.
Figure 9:
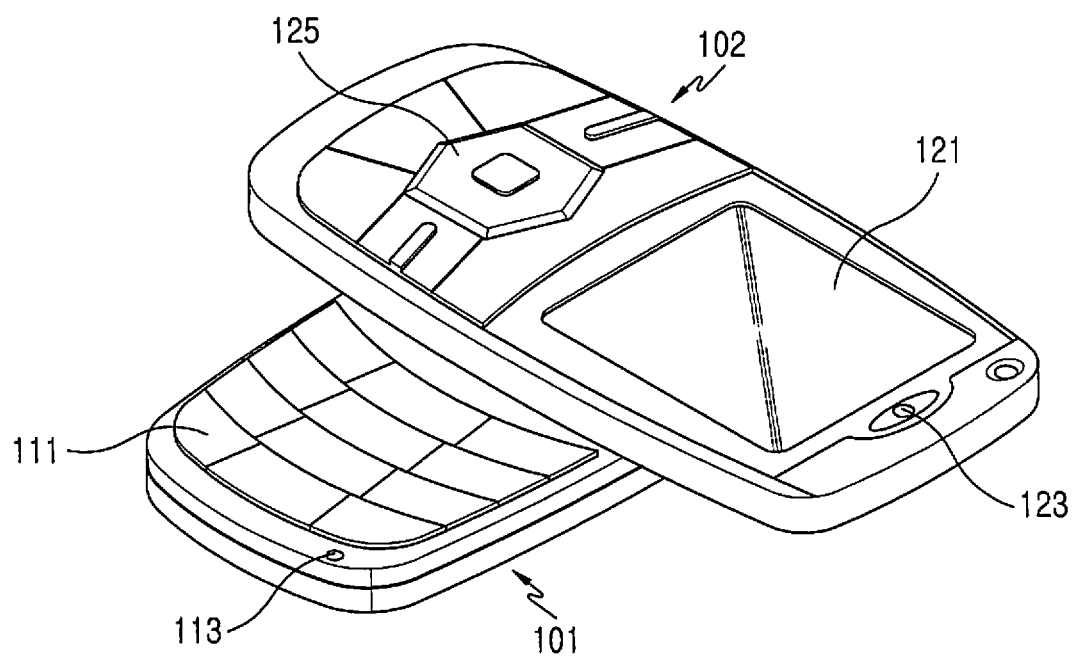
FIG. 9 is a perspective view of the mobile terminal in FIG. 1 with the second housing in a rotated state.

Referring further to FIGS. 7 to 9, the first housing 101 has a keypad 111 and a mouthpiece 113 on one side thereof. The keypad 111 and the mouthpiece 113 are opened by the slide or swivel movement of the second housing 102. The second housing 102 has a display unit 121, a functional keypad 125 and an earpiece 123 on one side thereof. The second housing 102 can slide up in a longitudinal direction or rotate around a rotation axis R (FIG. 7) to open the keypad 111 and the mouthpiece 113. The rotation axis R is provided in a direction perpendicular to one side of the first housing 101.

In other words, the sliding/swing module 200 is configured to enable the linear reciprocating movement as well as rotational movement of the second housing 102.

Referring back to FIG. 1, the sliding/swing module 200 includes a fixed member 201 and a movable member 202 coupled to the fixed member 201. The movable member 202 is linearly movable in a vertical (i.e. longitudinal) direction on the fixed member 201. Also, the movable member 202 can rotate around the rotation axis R provided in a direction perpendicular to one side of the fixed member 201. This rotation axis R is the same as the rotation axis R around which the second housing 102 rotates.

The fixed member 201 is mounted on a mount surface 119 formed on the first housing 101. The fixed member 201 has a first guide slit 211 cut on a right side thereof and a first guide projection 213 on a left side thereof. The first guide slit 211 penetrates through the entire thickness of the fixed member 201 and is provided in a direction of the linear movement of the second housing 102. The first guide projection 213 is spaced apart from a lower end 211a of the first guide slit 211 at a distance that is the same as the length of the first guide slit 211. Also, a line drawn from the first guide projection 213 to the lower end 211a of the first guide slit 211 is perpendicular to the first guide slit 211, which is provided in the longitudinal direction.

The movable member 202 is mounted on the other side of the second housing 102. The movable member 202 has a second guide slit 221 and a second guide projection 225 protruding from a surface facing the fixed member 201. The second guide slit 221 is provided in a direction of the linear movement of the second housing 102. The second guide projection 225 is spaced apart from an upper end 221a of the second guide slit 221 at a distance that is the same as the length of the second guide slit 221. Also, a line drawn from the second guide projection 225 and the upper end 221a of the second guide slit 221 is perpendicular to the longitudinal direction of the second guide slit 221, which is provided in the longitudinal direction.

The first and second guide slits 211 and 221 are both provided in a direction of the linear movement of the second housing 102. Accordingly, the two slits 211 and 221 are parallel with each other.

Figure 2:
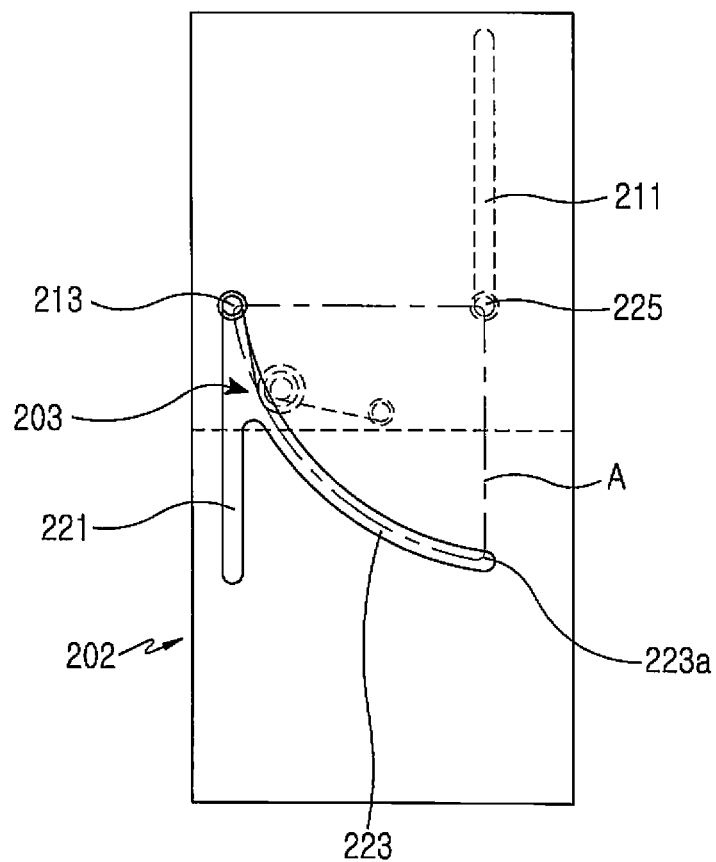
FIG. 2 is a plan view of the sliding/swing module in FIG. 1.

Referring to FIG. 2, the movable member 202 is coupled to the fixed member 201 with the first guide projection 213 inserted into the second guide slit 221 and with the second guide projection 225 inserted into the first guide slit 211. When the mobile terminal is in a closed state in which the second housing 102 overlaps the first housing 101 as a whole, the first guide projection 213 is located at the upper end 221a of the second guide slit 221, and the second guide projection 225 at the lower end 211a of the first guide slit 211. In other words, when the second housing 102 overlaps the first housing 101, the lower end 211a of the first guide slit 211 and the upper end 221a of the second guide slit 221 are both located in a line extending in a direction perpendicular to the length of the first and second guide slits 211 and 221. The first guide slit 211 extends upward from the lower end 211a, while the second slit 221 extends downward from the upper end 221a.

The movable member 202 moves linearly in the longitudinal direction of the fixed member 201, guided by the first and second guide slits 211 and 221 and the first and second guide projections 213 and 225, thereby moving the second housing 102 linearly on the first housing 101. When the movable member 202 moves linearly, the first guide projection 213 and the second guide projection 225 move along the second guide slit 221 and the first guide slit 211, respectively.

The movable member 202 further includes a third guide slit 223 extending in an arc from the upper end 221a of the second guide slit 221. More specifically, the third guide slit 223 extends from the upper end 221a of the second guide slit 221 that is formed by a 90° arc having a center point thereof at the lower end 211a of the first guide slit 211. The arc end point of the third guide slit 223 is spaced apart from the lower end of the second guide slit 221 at the same distance as the length of the second guide slit 221. In other words, the third guide slit 223 is formed in an arc shape having the arc start point at the upper end 221a of the second guide slit 221 and the arc end point spaced away from the lower end of the second guide slit 221.

The dimensions of the sliding/swing module are understood by connecting both ends of the second guide slit 221, the second guide projection 225 and the arc end point 223a of the third guide slit 223, wherein such connection forms a square. One of the four equal sides of the square is the second guide slit 221.

When the first and second housings 101 and 102 completely overlap, the second guide projection 225 is located at the lower end 211a of the first guide slit 211. At this time, the third guide slit 223 has a shape of an arc with a center point at the lower end 211a of the first guide slit 211.

The third guide slit 223 allows the movable member 202 to rotate around the rotation axis R while facing the fixed member 201. With the rotational movement of the movable member 202, the second housing 102 swivels on the facing first housing 101. The rotation axis R is provided in a direction perpendicular to one side of the fixed member 201 and one side of the first housing 101.

When the movable member 202 rotates, the second guide projection 225 located at the lower end 221a of the first guide slit 211 provides a center of rotation of the movable member 202 so that the third guide slit 223 can rotate around the rotation axis R. At this time, the first guide projection 213 moves along the third guide slit 223 to support the rotation of the movable member 202. Due to the support by the first and second guide projections 213 and 225 and the third guide slit 223, the movable member 202 can stably rotate on the facing fixed member 201.

The third guide slit 223 is provided in a 90° arc shape with a center point at the second guide projection 225. Since the angle between a line connecting the arc start point to the center point and a line connecting the arc end point to the center point is 90°, the movable member 202 can rotate up to 90°. In other words, the second housing 102 can rotate up to 90° on the facing first housing 101. When the second housing 102 is turned 90° with respect to the first housing 101, the movable member 202, the movable member 202 is placed in a horizontal direction of the fixed member 201. Also, the second housing 102 is placed in a horizontal direction of the first housing 101.

When the first guide projection 213 is located at the upper end 221a of the second guide slit 221 and the second guide projection 225 at the lower end 211a of the first guide slit 211, the movable member 202 can move in a linear manner or in a rotational manner.

When the movable member 202 moves linearly, thereby locating the first guide projection 213 at a lower end of the second guide slit 221, the movable member 202 cannot move in a rotational manner. To allow rotation of the movable member 202, the first guide projection 213 should move along the third guide slit 223. Once the first guide projection 213 has moved along the second guide slit 221 away from upper end 221a, it cannot move along the third guide slit 223 nor support the rotation of the movable member 202.

Similarly, when the movable member 202 rotates, thereby making the first guide projection move along the third guide slit 223, the movable member 202 cannot move linearly. To support the linear movement of the movable member 202, the first guide projection 213 should move along the second guide slit 221. Once the first guide projection 213 has moved along the third guide slit 223 away from upper end 221a, it cannot move along the second guide slit 221 nor support the linear movement of the movable member 202.

The sliding/swing module 200 further includes an elastic member 203 for providing a driving force for the linear or rotational movement of the movable member 202.

According to a preferred embodiment of the present invention, the elastic member 203 is a torsion spring having a coil 231 and two free ends 233 extending from the coil 231 in opposite directions. One of the free ends 233 is supported by the fixed member 201 and the other free end is supported by the movable member 202. The elastic member 203 exerts an elastic force in a direction for keeping the two free ends 233 away from each other.

One of the free ends 233 is supported by the first guide projection 213 of the fixed member 201. The other free end is mounted within a fan-shaped area A (see FIG. 2) of the movable member 202, which is defined by the third guide slit 223 and the second guide projection 225. In a preferred embodiment of the present invention, the other free end is disposed at a distance inward from the center (i.e., a 45° arc) of the third guide slit 223. A line passing through the second guide projection 225 and the other free end passes through the center of the third guide slit 223.

Figure 10A:
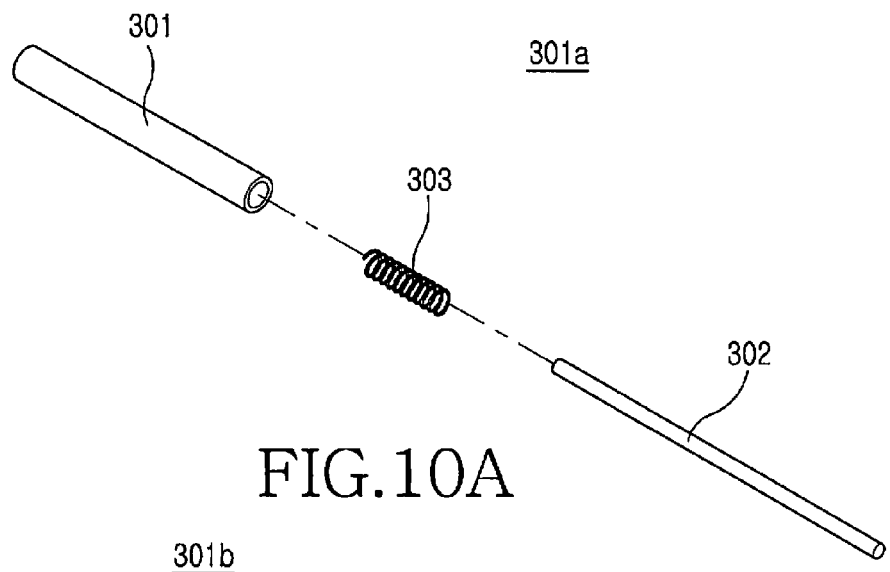
FIGS. 10A-C are perspective views of example elastic members usable in the sliding swing module of FIG. 1.
Figure 10B:
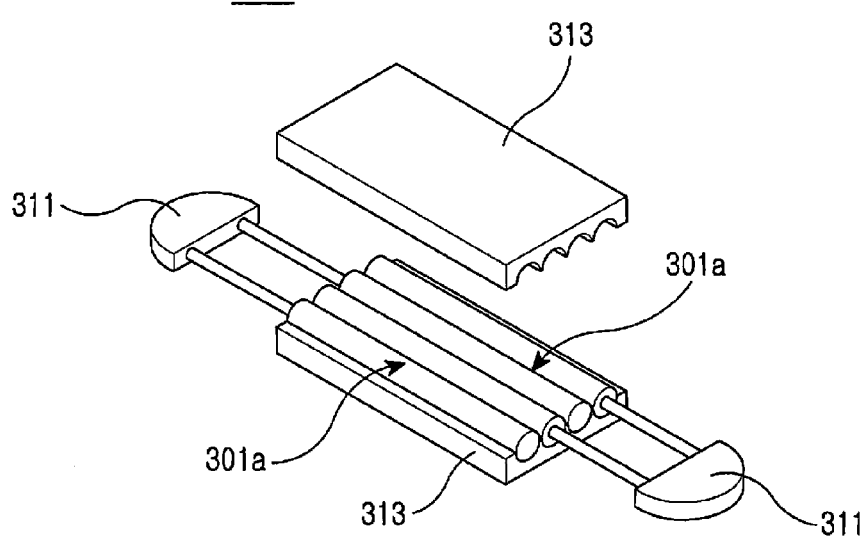
Figure 10C:
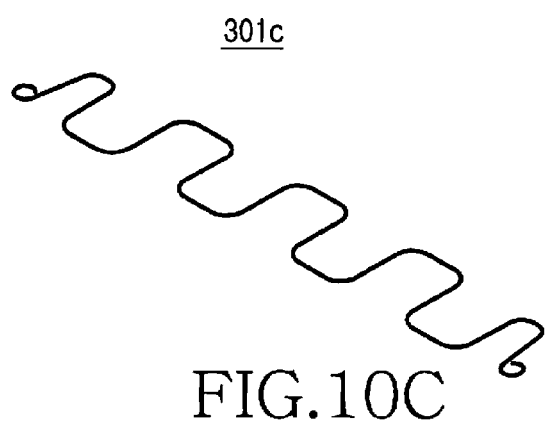

The elastic member 203 can be a torsion spring as illustrated in FIG. 1 or any other type spring which exerts an elastic force in a direction that keeps the ends of the spring away from each other. For example, a compression coil spring can be used. As illustrated in FIG. 10A, a push rod 301a, a push rod module 301b having at least one pair of push rods 301a, or a zigzag-shaped wire spring 301c can also be used as the elastic member 203, as shown in FIG. 10C.

The push rod 301a has a structure that contains a compression coil spring 303 and a support rod 302 in a tube 301. The support rod 302 is retractably contained in the tube 301. The compression coil spring 303 exerts an elastic force acting in a direction to push the support rod 302 outward from the tube 301. In other words, the push rod 301a exerts an elastic force against one end of the support rod 302 to keep the end of the support rod 302 away from the closed end of the tube 301.

The closed end of the tube 301 is supported by the fixed member 201 and the opposite end of the support rod 302 by the movable member 202 so that the push rod 301a can function the same as the torsion spring.

The push rod module 301b includes at least one pair of push rods 301a disposed in parallel, and exerts an elastic force to push the support rods 302 contained in the push rods 301 outward in opposite directions. FIG. 10B illustrates a push rod module 301b having two pairs of push rods 301a. Four tubes 301 are mounted within a module housing 313. The push rod module 301b further includes two support bodies 311, each of which connects ends of two support rods 302 retractable in the same direction. One of the support bodies 311 is supported by the fixed member 201 and the other by the movable member 202 so that the push rod module 301b can function the same as the torsion spring.

The wire spring 301c is bent in a zigzag shape. One end of the wire spring 301c is supported by the fixed member 201 and the other end by the movable member 202 so that the wire spring 301c can function the same as the torsion spring.

In summary, any type spring can produce the same function and effect as the elastic member 203 as long as it exerts an elastic force in a direction for retaining its ends away from each other.

When the movable member 202 moves linearly, the elastic member 203 provides a driving force for moving the movable member 202 toward the lower part of the fixed member 201 in a certain range of movement and toward the upper part of the fixed member 201 in the remaining range of movement. It is obvious that the second housing 102 having the movable member 202 receives the same driving force as applied to the movable member 202.

When the movable member 202 rotates on the fixed member 201, the elastic member 203 provides a driving force for locating the first guide projection 213 at the upper end 221a of the second guide slit 221 in a certain range of rotation angles. Also, the elastic member 203 provides a driving force for moving the first guide projection 213 along the third guide slit 223 to be located at the arc end point of the third guide slit 223 in the remaining range of rotation angles.

Hereinafter, the movement of the movable member 202 and the second housing 102 in a linear or rotational manner due to the elastic force from the elastic member 203 is explained in detail with reference to FIGS. 2 through 9.

As illustrated in FIG. 7, the second housing 102 and the first housing 101 completely overlap each other when closed. At this time, the upper part of the movable member 202 overlaps the fixed member 201. The first guide projection 213 is located at the upper end 221a of the second guide slit 221, and the second guide projection 225 at the lower end 211a of the first guide slit 211. The first guide projection 213 is movable along the second guide slit 221 or along the third guide slit 223. In other words, the second housing 102 can move up linearly or swivel on the facing first housing 101.

Figure 3:
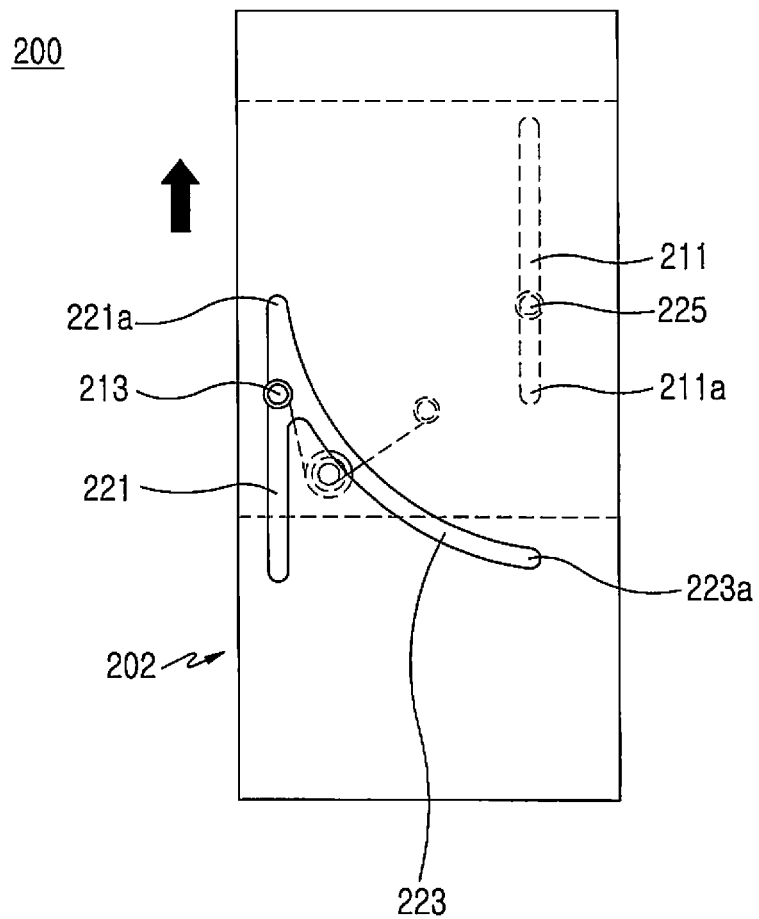
FIG. 3 is a plan view showing a linear movement of a movable member of the sliding/swing module in FIG. 2.
Figure 4:
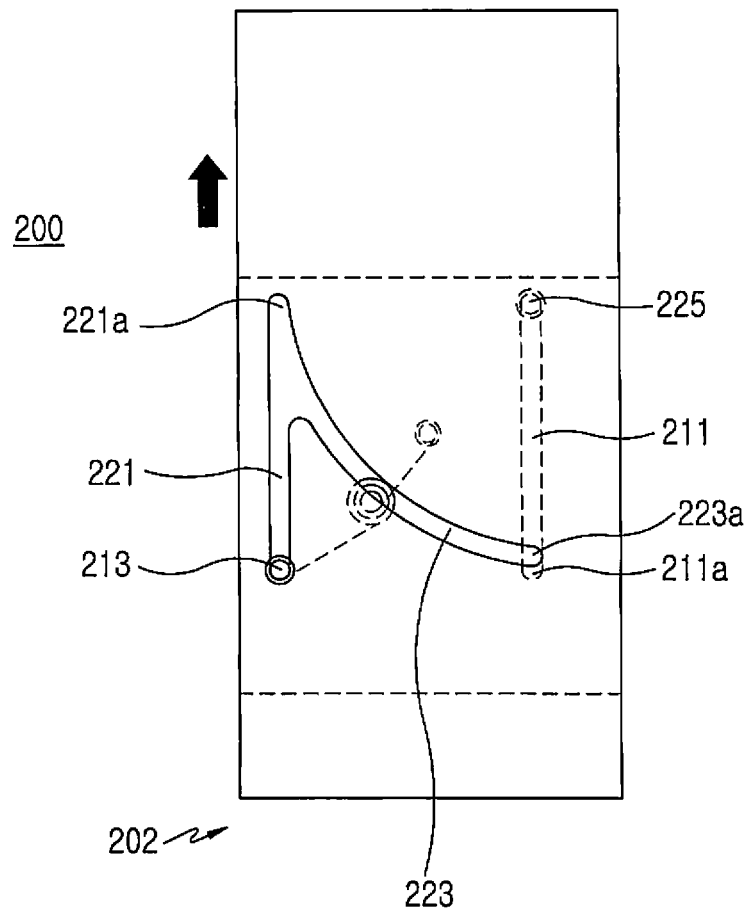
FIG. 4 is a plan view showing the movable member moved up linearly in the sliding/swing module in FIG. 2.

FIGS. 3 and 4 illustrate the upward movement of the second housing 102 on the first housing 101. FIG. 8 is a perspective view of a mobile terminal in an opened state with the second housing 102 moved up linearly. FIG. 4 is a corresponding plan view of the sliding/swing module 200 with the second housing 102 moved up linearly.

FIG. 3 shows the two ends of the elastic member 203 are positioned closest to each other during the upward movement of the second housing 102 on the facing first housing 101.

While the second housing 102 is moving up, the first guide projection 213 moves linearly along the second guide slit 221 and the second guide projection 225 along the first guide slit 211.

Free ends 233 of the elastic member 203 come closer and closer until the second housing 102 moves up to a point at which the free ends 233 are closest to each other. More specifically, the free end supported by the movable member 202 becomes closer to the other free end fixed on the fixed member 201.

The elastic force accumulated in the elastic member 203 with the free ends 233 becoming closer is exerted as a driving force for moving the second housing downward. In other words, the elastic member 203 generates a driving force for moving the movable member 202 toward the lower part of the fixed member 201 and moving the second housing 102 to the original position overlapping the first housing in a certain range of movement, i.e. from a point at which the second housing 102 completely overlaps the first housing 101 to a point at which the free ends 233 of the elastic member 203 become closest to each other.

FIGS. 4 and 8 illustrate the movable member 202 moved up on the fixed member 201 and the second housing 102 moved up linearly to open the front side of the first housing 101.

When the second housing 102 is moved up further, passing the point at which the free ends 233 of the elastic member 203 come closest to each other, the elastic member 203 generates a driving force for moving the second housing 102 upward. In the position illustrated in FIG. 8, the elastic member 203 exerts a driving force for moving the movable member 202 toward the upper part of the fixed member 201 and moving the second housing 102 upward to open the front side of the first housing 101 in the remaining range of movement, i.e. from the point at which the free ends 233 of the elastic member 203 become closest to a point at which the second housing 102 is moved up to upmost position.

When the second housing 102 is moved up in a longitudinal direction of the first housing 101 as illustrated in FIG. 8, the keypad 111 and the mouthpiece 113 are opened so that the user can use general mobile communication services, such as a voice call or an SMS service.

The rotational movement of the movable member 202 and the second housing 102 will be explained in detail with reference to FIGS. 5, 6 and 9.

Figure 5:
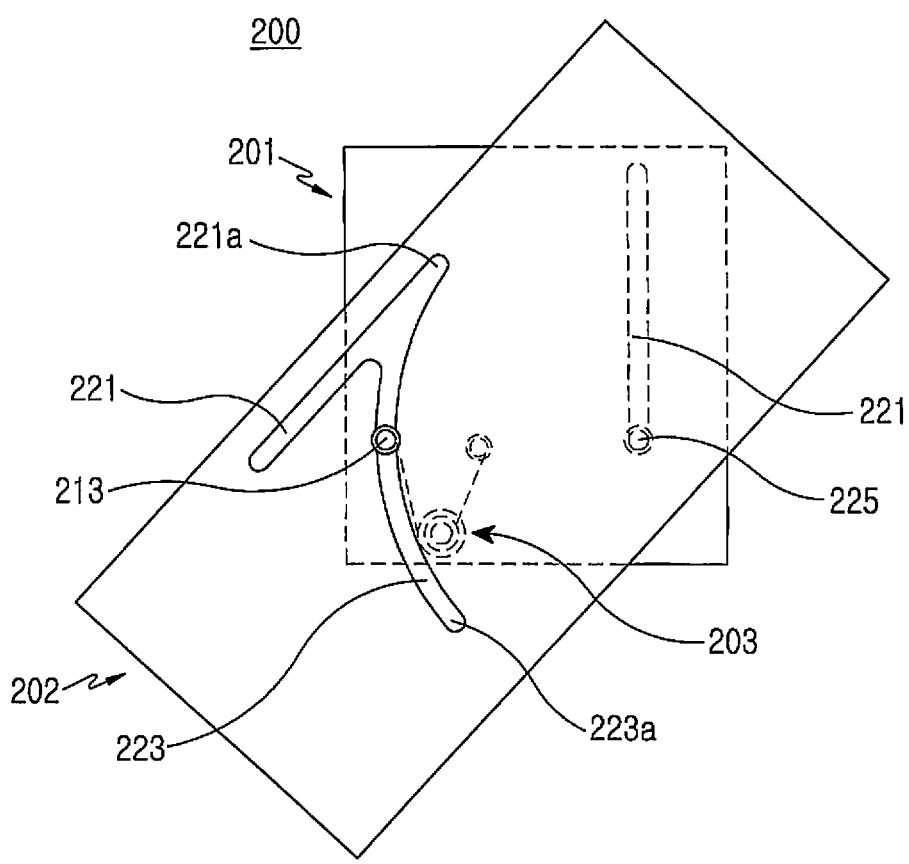
FIG. 5 is a plan view showing a rotational movement of the movable member of the sliding/swing module in FIG. 2.
Figure 6:
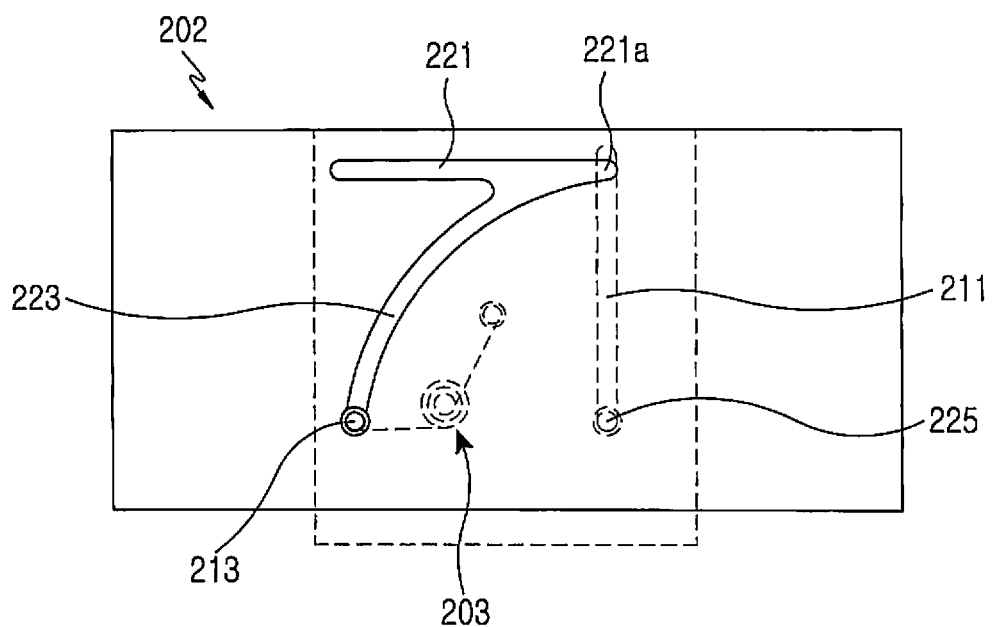
FIG. 6 is a plan view showing the movable member moved in a rotational manner in the sliding/swing module in FIG. 2.

FIG. 5 illustrates the sliding/swing module 200 when the second housing 102 is turned 45° in a clockwise direction. FIGS. 6 and 9 illustrate the sliding/swing module 200 and the mobile terminal 100 when the second housing 102 is turned 90° on the facing first housing 101.

Referring to FIG. 5, when the user rotates the second housing 102 overlapping the first housing 101 by 45°, the movable member 202 also rotates 45° to locate the first and second guide projections 213 and 225 and the free ends 233 of the elastic member 203 in a straight line. At this time, the two ends of the elastic member 203 come closest to each other.

The free ends 233 of the elastic member 203 come closer and closer until the second housing 102 is rotated by an angle (45°), at which point the free ends 233 come closest. The elastic member 203 generates a driving force for moving the second housing 102 to the original position overlapping the first housing in a certain range of rotation angles, i.e. from an angle at which the second housing 102 completely overlaps the first housing 101 to an angle at which the free ends 233 of the elastic member 203 come closest to each other. In other words, the elastic force exerted by the elastic member 203 in the above range of rotation angles forces the movable member 202 to rotate in the reverse direction for locating the first guide projection 213 at the upper end 221a of the second guide slit 221.

The second housing 102 can be rotated within a range of angles defined by the third guide slit 223. As is clear from the arc angle of the third guide slit 223, the maximum rotation angle is 90°.

Referring to FIG. 9, when the second housing 102 swivels 90° from its original position overlapping the first housing 101, it is placed in a horizontal direction of the first housing 101, which provides a wider or horizontal display suitable to use multimedia services. The user can use multimedia services, such as DMB services, holding the first housing in a hand.

The elastic member 203 exerts a driving force for rotating the second housing 102 in a clockwise direction in a range from an angle at which the free ends 233 of the elastic member 203 come closest to each other to an angle at which the second housing 102 is placed in a horizontal direction of the first housing 101.

When the user slides up or swivels the second housing 102 beyond the point or angle at which the free ends 233 of the elastic member 203 come closest to each other, the second housing 102 automatically slides up to the upmost position or swivels up to 90° due to the driving force exerted by the elastic member 203.

In other words, the elastic member 203 generates a driving force acting in the same direction as the linear or rotational movement of the movable member 202 and the second housing 102 or in the reverse direction according to the location of the movable member 202 and the second housing 102. The user needs to slide up or swivel the second housing 102 only to the extent beyond the range of movement or rotation angles at which the elastic member 203 exerts a driving force acting in a direction reverse to the direction of movement of the second housing 102. When passing the range, the second housing 102 automatically slides up or rotates further due to the elastic force acting in the same direction as the sliding or swivel movement.

When the first housing 101 and the second housing 102 completely overlap each other, the first guide projection 213 is located at the upper end 221a of the second guide slit 221, and the second guide projection 225 at the lower end 211a of the first guide slit 211. In this state, the second housing 102 can move up linearly or swivel on the facing first housing 101. In other words, the first guide projection 213 can move along either the second guide slit 221 or the third guide slit 223.

The second housing 102 cannot rotate once it moves up linearly to open the front surface of the first housing 101. The second housing 102 can return to its original position overlapping the first housing 101 only by a downward linear movement. Similarly, the second housing 102 cannot move up or down once it is rotated. The second housing 102 can return to its original position overlapping the first housing 101 only by a rotational movement in a reverse direction. The above will be obvious in view of the configurations of the first and third guide slits 221 and 223 and the first guide projection 213.

As explained above, the sliding/swing module according to the present invention enables both a linear reciprocating movement of a housing, which is possible in a conventional slide-type mobile terminal, and a rotational movement of the housing to a horizontal display direction, which is possible in a conventional swing-type mobile terminal. Accordingly, the user can conveniently use both mobile communication services and multimedia services, such as DMB services, with a single mobile terminal by sliding up or swiveling the display housing. In other words, the user can open the mobile terminal in a sliding or swing manner suitable for multimedia services or communication services.

While having the same appearance as a general slide-type terminal, a mobile terminal having the sliding/swing module according to the present invention is also capable of swinging open. The sliding/swing module according to the present invention can reduce the size of a mobile terminal and improve portability.

In addition, the sliding/swing module can boost design diversification in a mobile phone market which provides limited designs, such as a folder-type, a slide-type and a swing-type. Although a slide-type mobile terminal with a sliding/swing module has been explained above, the sliding/swing module according to the present invention is applicable to any type of terminals, including a folder-type or a type combining a housing to a main body or folder.

While the invention has been shown and described with reference to certain exemplary embodiments thereof, it will be understood by those skilled in the art that various changes in form and details may be made therein without departing from the spirit and scope of the invention as defined by the appended claims.

What is claimed is:

1. A mobile terminal comprising:
a first housing;
a second housing coupled to the first housing; and
a sliding/swing module for coupling the second housing to the first housing to face each other,
wherein the second housing is movable in both a linear manner, from a position in which the second housing and the first housing overlap each other, and in a rotational manner, from the position in which the second housing and the first housing overlap each other, while facing the first housing.

2. The mobile terminal according to claim 1, wherein the second housing rotates around a rotation axis extending in a direction perpendicular to one side of the first housing.

3. The mobile terminal according to claim 2, wherein the second housing is movable to an original position overlapping the first housing by a downward linear movement after moving up linearly, and by rotational movement in a reverse direction when rotated.

4. The mobile terminal according to claim 1, wherein the second housing moves either in the linear manner to a vertical direction of the first housing or in the rotational manner up to 90° to place the second housing in a horizontal direction relative to the first housing from an original position overlapping the first housing.

5. A mobile terminal, comprising:
a first housing;
a second housing movable coupled to the first housing in both a linear manner in a longitudinal direction and a rotational manner while facing the first housing; and
a sliding/swing module for coupling the second housing to the first housing to face each other,
wherein the sliding/swing module comprises:
a fixed member mounted on the first housing:
a movable member mounted on the second housing and coupled to the fixed member to be movable in linear or rotational manner on the fixed member; and
an elastic member having one end supported by the movable member and the other end supported by the fixed member,
wherein the elastic member generates a driving force acting in a same direction as both the linear and the rotational movement of the second housing or in a reverse direction according to a location of the second housing.

6. The mobile terminal according to claim 5, wherein the movable member can not move in the rotational manner after moving linearly and can not move in the linear manner after moving in the rotational manner.

7. The mobile terminal according to claim 5, wherein the movable member is free to move in both the linear and the rotational manner when the first and second housings completely overlap each other.

8. The mobile terminal according to claim 5, wherein the sliding/swing module further comprises:
a first guide slit formed on the fixed member and extending in a longitudinal direction of the fixed member;
a second guide slit formed on the movable member and extending in a longitudinal direction of the movable member; and
a third guide slit formed on the movable member and extending in an arc shape from an upper end of the second guide slit.

9. The mobile terminal according to claim 8, wherein the sliding/swing module further comprises:
a first guide projection formed on the fixed member and selectably movable along the second or third guide slit; and
a second guide projection formed on the movable member and movable along the first guide slit.

10. The mobile terminal according to claim 8, wherein a lower end of the first guide slit and the upper end of the second guide slit are located in a line extending in a direction perpendicular to the first and second guide slits when the first and second housings completely overlap, the first guide slit extending upward from the lower end thereof, and the second slit extending downward from the upper end thereof.

11. The mobile terminal according to claim 8, wherein the third guide slit is formed in an arc shape having an arc start point at the upper end of the second guide slit and an arc end point spaced away from a lower end of the second guide slit.

12. The mobile terminal according to claim 11, wherein the sliding/swing module further comprises:
a first guide projection formed on the fixed member and selectably movable along the second or third guide slit; and
a second guide projection formed on the movable member and movable along the first guide slit,
wherein the first guide projection is located at the upper end of the second guide slit and the second guide projection at a lower end of the first guide slit when the first and second housings completely overlap.

13. The mobile terminal according to claim 12, wherein the second guide projection is located at a center point of the arc formed by the third guide slit.

14. The mobile terminal according to claim 13, wherein the third guide slit extends by 90° in an arc shape from the upper end of the second guide slit.

15. The mobile terminal according to claim 12, wherein one end of the elastic member is supported by the first guide projection and an other end is mounted within a fan-shaped area defined by the third guide slit.

16. The mobile terminal according to claim 5, wherein the elastic member has a coil at the center thereof and a pair of free ends extending from the coil in opposite directions, one of the free ends being supported by the fixed member and an other by the movable member, the coil generating an elastic force acting in a direction for retaining the free ends away from each other.

17. The mobile terminal according to claim 5, wherein the elastic member is a zigzag-shaped wire spring having one end supported by the fixed member and an other end supported by the movable member and generating an elastic force acting in a direction for retaining both ends away from each other.

18. The mobile terminal according to claim 5, wherein the elastic member is a push rod which comprises a tube, a support rod retractably contained in the tube and a spring for generating an elastic force acting in a direction for pushing the support rod out from the tube, one end of the tube being supported by the fixed member and an other end by the movable member.

19. The mobile terminal according to claim 18, wherein the elastic member comprises at least one pair of push rods disposed in parallel to accumulate the elastic force for pushing the support rods in opposite directions.

* * * * *